United States Patent
Lee et al.

(10) Patent No.: US 11,705,283 B2
(45) Date of Patent: Jul. 18, 2023

(54) MULTILAYER CERAMIC ELECTRONIC COMPONENT

(71) Applicant: SAMSUNG ELECTRO-MECHANICS CO., LTD., Suwon-si (KR)

(72) Inventors: Kyo Yeol Lee, Suwon-si (KR); Seung Hun Han, Suwon-si (KR); In Young Kang, Suwon-si (KR); Jung Min Kim, Suwon-si (KR); Jeong Ryeol Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/468,240

(22) Filed: Sep. 7, 2021

(65) Prior Publication Data

US 2022/0208465 A1 Jun. 30, 2022

(30) Foreign Application Priority Data

Dec. 31, 2020 (KR) ........................ 10-2020-0189536

(51) Int. Cl.
*H01G 4/30* (2006.01)
*H01G 4/232* (2006.01)
(Continued)

(52) U.S. Cl.
CPC ............... *H01G 4/30* (2013.01); *H01G 4/008* (2013.01); *H01G 4/012* (2013.01); *H01G 4/2325* (2013.01)

(58) Field of Classification Search
CPC ............ H01G 4/30; H01G 4/12; H01G 4/248; H01G 4/012; H01G 4/1209; H01G 4/232; H01G 4/0085; H01G 4/1227; H01G 4/2325; H01G 4/224; H01G 2/065; H01G 4/008; H01G 4/1218
See application file for complete search history.

(56) References Cited

U.S. PATENT DOCUMENTS 4,377,619 A 3/1983 Schonhorn et al.
5,534,843 A * 7/1996 Tsunoda ............... H01C 1/1406
338/262

(Continued)

FOREIGN PATENT DOCUMENTS

JP 2000-164406 A 6/2000
JP 3444291 B2 9/2003
(Continued)

*Primary Examiner* — Michael P McFadden
(74) *Attorney, Agent, or Firm* — Morgan, Lewis & Bockius LLP

(57) ABSTRACT

A multilayer ceramic electronic component includes a ceramic body including a first internal electrode and a second internal electrode disposed to be alternately stacked with a dielectric layer interposed therebetween, a first external electrode connected to the first internal electrode and including a first electrode layer, a first conductive layer, and a first metal layer, a second external electrode connected to the second internal electrode and including a second electrode layer, a second conductive layer, and a second metal layer, and a first coating layer disposed on the ceramic body, the first electrode layer and the second electrode layer, wherein the first coating layer may include an alkyl(meth)acrylate-based polymer.

20 Claims, 4 Drawing Sheets

(51) Int. Cl.
   *H01G 4/008*      (2006.01)
   *H01G 4/012*      (2006.01)

(56) References Cited

U.S. PATENT DOCUMENTS

| | | | |
|---|---|---|---|
| 8,587,923 B2 | 11/2013 | Ogawa et al. | |
| 9,758,695 B2 | 9/2017 | Hong et al. | |
| 2008/0029126 A1* | 2/2008 | Thomas | C23F 3/00 |
| | | | 51/303 |
| 2010/0290172 A1* | 11/2010 | Motoki | H01G 4/2325 |
| | | | 427/79 |
| 2010/0302704 A1* | 12/2010 | Ogawa | H01G 4/2325 |
| | | | 361/306.3 |
| 2015/0084487 A1* | 3/2015 | Mori | H01G 4/232 |
| | | | 336/200 |
| 2017/0330689 A1* | 11/2017 | Hatanaka | H01G 2/06 |
| 2018/0082788 A1* | 3/2018 | Asano | H01G 4/005 |
| 2019/0276638 A1* | 9/2019 | Yao | C08B 3/10 |

FOREIGN PATENT DOCUMENTS

| | | |
|---|---|---|
| JP | 2010-267901 A | 11/2010 |
| JP | 2018-049882 A | 3/2018 |
| WO | 2014/027854 A1 | 2/2014 |

\* cited by examiner

I – I'

MULTILAYER CERAMIC ELECTRONIC COMPONENT

CROSS-REFERENCE TO RELATED APPLICATION

This application claims the benefit of priority to Korean Patent Application No. 10-2020-0189536, filed on Dec. 31, 2020 in the Korean Intellectual Property Office, the disclosure of which is incorporated herein by reference in its entirety.

TECHNICAL FIELD

The present disclosure relates to a multilayer ceramic electronic component.

BACKGROUND

In recent years, as an application area of electronic products has expanded, a technical field in which multilayer ceramic electronic components are used has also expanded. In particular, a structure in which an electronic control unit (ECU) or a transmission control unit (TCU) of a vehicle is disposed in an engine bay or directly attached to a transmission is used as vehicles are increasingly electronic.

However, when existing multilayer ceramic electronic components are applied to a harsh environment such as an environment having high temperatures and high vibrations, expansion and contraction due to high/low temperature cycles are repeated to cause continuous mechanical stress. In addition, the application of continuous mechanical stress is a major cause of cracking in terminal electrodes or solders.

In addition, in the process of manufacturing a multilayer ceramic electronic component, a plating layer is often formed on an external electrode after sintering a ceramic body and the external electrode, and when an electronic component is manufactured by a high temperature heat treatment, there is a high possibility that a hydrophilic oxide layer having high surface energy may be formed on a surface of the ceramic body and pores serving as a path through which moisture may penetrate occur at an interface between the ceramic body and the external electrode.

In particular, when the multilayer ceramic electronic component is continuously exposed to a high temperature and/or high humidity environment, the possibility of ion migration is increased in the external electrode of the multilayer ceramic electronic component itself. The oxide layer formed on the surface of the ceramic body has high surface energy, causing moisture to easily adhere to the surface of the ceramic body due to its hydrophilicity upon application of high temperature, high humidity, and voltage. Through such moisture, an ion migration phenomenon in which an electrode material migrates toward the opposite electrode occurs, and a short circuit may occur, to degrade reliability of the multilayer ceramic electronic component.

SUMMARY

An aspect of the present disclosure may provide a multilayer ceramic electronic component in which a degradation of characteristics due to moisture penetration is prevented.

Another aspect of the present disclosure may provide a multilayer ceramic electronic component in which ion migration is suppressed.

Another aspect of the present disclosure may provide a multilayer ceramic electronic component in which a short circuit defect is reduced.

Another aspect of the present disclosure may provide a multilayer ceramic electronic component having excellent reliability.

According to an aspect of the present disclosure, a multilayer ceramic electronic component includes: a ceramic body including a first internal electrode and a second internal electrode disposed to be alternately stacked in a third direction with a dielectric layer interposed therebetween, and having a first surface and a second surface opposing each other in a first direction, a third surface and a fourth surface opposing each other in a second direction, and a fifth surface and a sixth surface opposing each other in the third direction; a first external electrode connected to the first internal electrode and including a first electrode layer, a first conductive layer, and a first metal layer; a second external electrode connected to the second internal electrode and including a second electrode layer, a second conductive layer, and a second metal layer; and a first coating layer disposed on the ceramic body, the first electrode layer and the second electrode layer, wherein the first coating layer may include an alkyl(meth)acrylate-based polymer.

According to another aspect of the present disclosure, a multilayer ceramic electronic component includes: a ceramic body including a first internal electrode and a second internal electrode disposed to be alternately stacked with a dielectric layer interposed therebetween; a first external electrode connected to the first internal electrode and including a first electrode layer and a first conductive layer; a second external electrode connected to the second internal electrode and including a second electrode layer and a second conductive layer; and a first coating layer including an alkyl(meth)acrylate-based polymer. The first electrode layer, a first portion of the first coating layer, and the first conductive layer are sequentially stacked on the ceramic body, and the second electrode layer, a second portion of the first coating layer, and the second conductive layer are sequentially stacked on the ceramic body.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
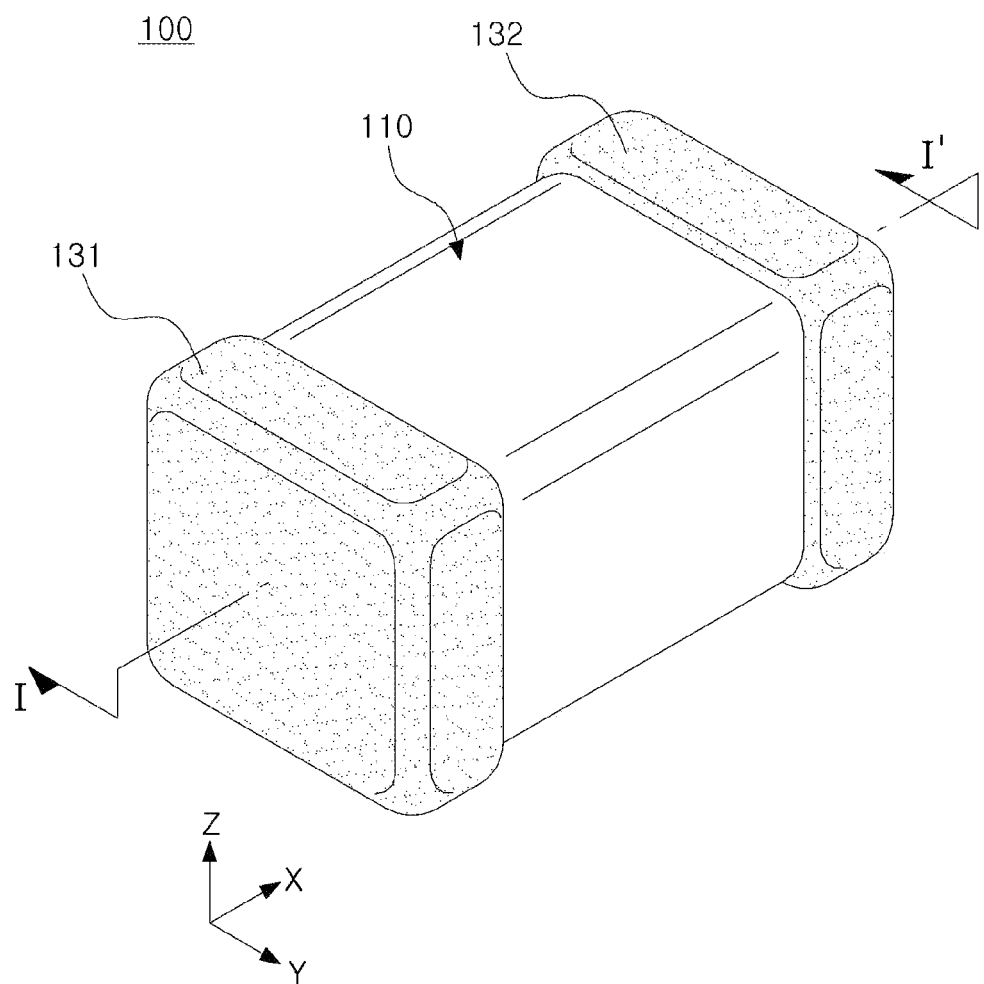
FIG. 1 is a perspective view schematically illustrating a multilayer ceramic electronic component according to an exemplary embodiment in the present disclosure.

Exemplary embodiments of the present disclosure will now be described in detail with reference to the accompanying drawings.

In the drawings, an X direction may be defined as a first direction, an L direction, or a length direction, a Y direction may be defined as a second direction, a W direction, or a width direction, and a Z direction may be defined as a third direction, a T direction, or a thickness direction.

Figure 2:
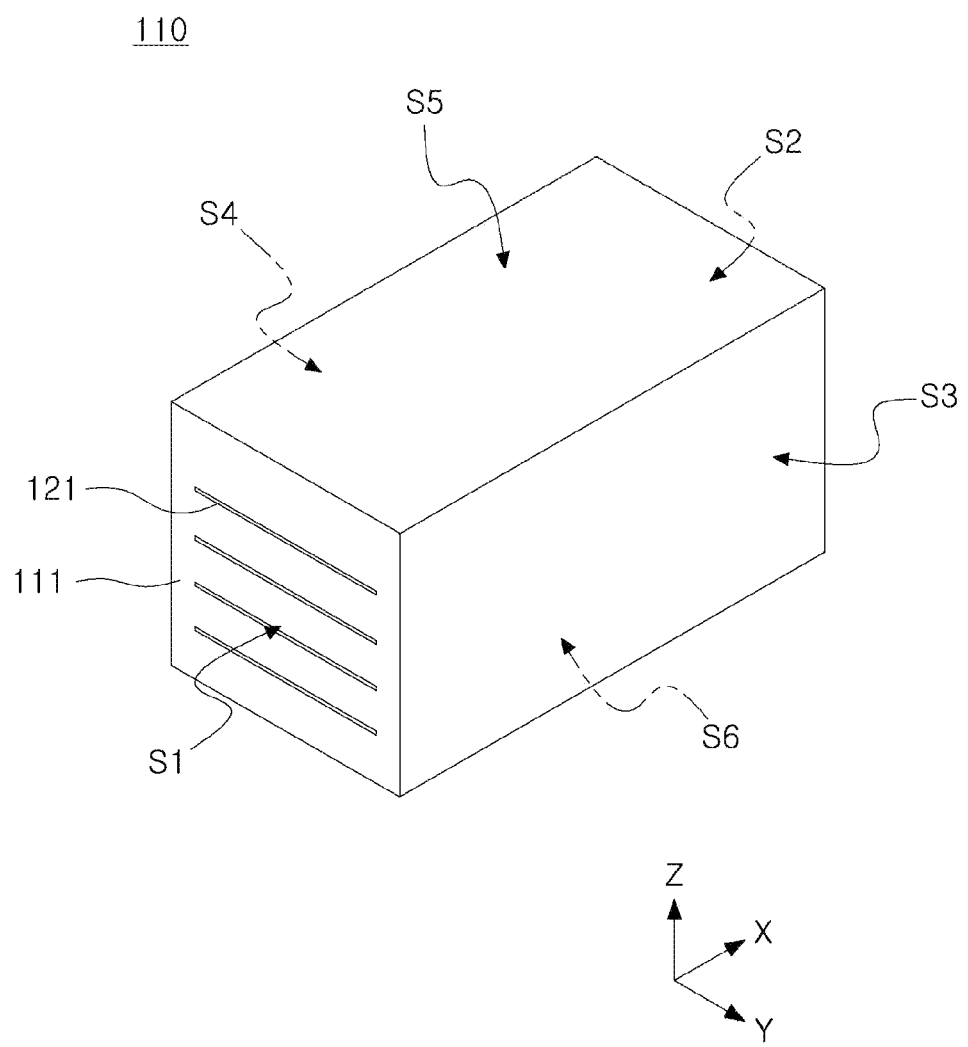
FIG. 2 is a perspective view schematically illustrating a ceramic body of FIG. 1.
Figure 3:
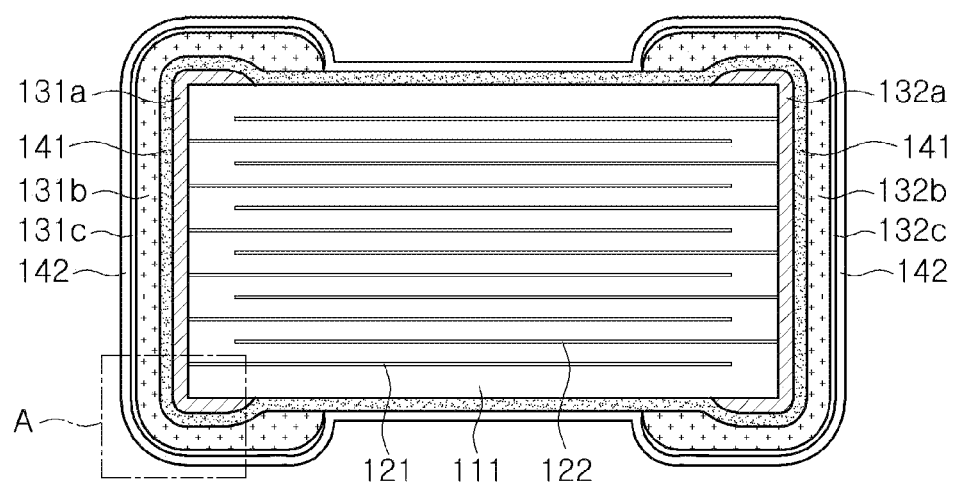
FIG. 3 is a cross-sectional view taken along line I-I' of FIG. 1.
Figure 3:
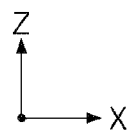
Figure 4:
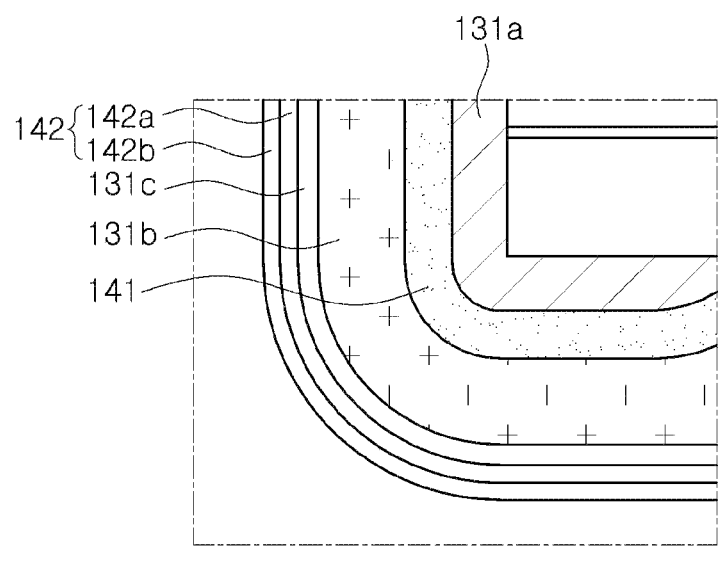
FIG. 4 is an enlarged view of region A of FIG. 3.

The present disclosure relates to a multilayer ceramic electronic component. FIGS. 1 through 4 are views schematically illustrating a multilayer ceramic electronic component according to an exemplary embodiment of the present disclosure. Referring to FIGS. 1 through 4, a multilayer ceramic electronic component 100 according to an exemplary embodiment may include a ceramic body 110 including a dielectric layer 111 and a first internal electrode 121 and a second internal electrode 122 disposed to be alternately stacked in the third direction (Z direction) with the dielectric layer 111 interposed therebetween and having a first surface S1 and a second surface S2 opposing each other in the first direction (X direction), a third surface S3 and a fourth surface S4 opposing each other in the second direction (Y direction), and a fifth surface S5 and a sixth surface S6 opposing each other in the third direction (Z direction); a first external electrode 131 connected to the first internal electrode 121 and including a first electrode layer 131a, a first conductive layer 131b, and a first metal layer 131c; a second external electrode 132 connected to the second internal electrode 122 and including a second electrode layer 132a, a second conductive layer 132b, and a second metal layer 132c; and a first coating layer 141 disposed on the ceramic body 110, the first electrode layer 131a and the second electrode layer 132a.

Here, the first coating layer 141 may include an alkyl (meth)acrylate-based polymer.

Moisture resistance reliability of the multilayer ceramic electronic component may be largely affected by two factors. First, product defects may occur due to penetration of a plating solution during a manufacturing process, and, second, external moisture may penetrate during the use of a finished product, thereby reducing the life of the product. In recent years, the size of products has been reduced and, at the same time, an external electrode having a multilayer structure has been increasingly used to satisfy various electrical properties and/or mechanical properties. However, when a plating layer is formed on the external electrode having the multilayer structure, a plating solution may penetrate. In addition, in the case of using a method of forming a protective layer or the like on the outside, there is a limitation in that bonding force between a surface of a ceramic body and the protective layer is not generally strong and it is difficult to sufficiently secure reliability of the chip when exposed to repeated vibrations. In order to solve the above problems, the multilayer ceramic electronic component 100 according to the present exemplary embodiment may include a first coating layer 141 may be disposed on the ceramic body 110 and first and second electrode layers 131a and 132a of first and second external electrodes 131 and 132 to prevent moisture penetration, suppress ion migration, and improve bonding strength with the multilayer ceramic electronic component, thereby improving moisture resistance reliability.

The multilayer ceramic electronic component 100 according to an exemplary embodiment in the present disclosure may include the ceramic body 110 including the dielectric layer 111 and the first and second internal electrodes 121 and 122 disposed to be alternately stacked in the third direction (Z direction) with the dielectric layer 111 interposed therebetween.

The ceramic body 110 may include the first and second surfaces S1 and S2 opposing in the first direction (X direction), the third and fourth surfaces S3 and S4 opposing in the second direction (Y direction), and the fifth and sixth surfaces S5 and S6 opposing in the third direction (Z direction).

There is no particular limitation on a specific shape of the ceramic body 110, but as shown, the ceramic body 110 may have a hexahedral shape or a similar shape. Due to the shrinkage of the ceramic powder contained in the ceramic body 110 during a firing process, the ceramic body 110 may have a substantially hexahedral shape, although it is not a hexahedral shape having a complete straight line. If necessary, the ceramic body 110 may be rounded so that the corners are not angled. The rounding treatment may be, for example, barrel polishing, but is not limited thereto.

In the ceramic body 110, the dielectric layer 111, the first internal electrode 121, and the second internal electrode 122 may be alternately stacked. The dielectric layer 111, the first internal electrode 121, and the second internal electrode 122 may be stacked in the third direction (Z direction). The plurality of dielectric layers 111 are in a sintered state, and adjacent dielectric layers 111 may be integrated such that boundaries therebetween may not be readily apparent without using a scanning electron microscope (SEM).

According to an exemplary embodiment in the present disclosure, the dielectric layer 111 may include a component represented by $(Ba_{1-x}Ca_x)(Ti_{1-y}(Zr, Sn, Hf)_y)O_3$ (here, $0 \leq x \leq 1$ and $0 \leq y \leq 0.5$). The component may be, for example, a compound in which Ca, Zr, Sn and/or Hf is partially dissolved in $BaTiO_3$. In the above compositional formula, x may be in the range of 0 or more and 1 or less and y may be in the range of 0 or more and 0.5 or less, but is not limited thereto. For example, when x is 0, y is 0, and z is 0 in the above compositional formula, the component may be $BaTiO_3$. In addition, various ceramic additives, organic solvents, plasticizers, binders, dispersants, and the like may be added to the component according to the purpose of the present disclosure.

The dielectric layer 111 may be formed by adding an additive as necessary to a slurry containing the aforementioned material, applying slurry on a carrier film, and drying the slurry to prepare a plurality of ceramic sheets. The ceramic sheet may be formed by fabricating the slurry into a sheet type having a thickness of several μm by a doctor blade method, but is not limited thereto.

The ceramic body 110 may be formed by alternately stacking a ceramic green sheet in which the first internal electrode 121 is printed on the dielectric layer 111 and a ceramic green sheet in which the second internal electrode 122 is printed on the dielectric layer 111 in the third direction (Z direction). A printing method of the first and second internal electrodes 121 and 122 may be a screen-printing method or a gravure printing method, but is not limited thereto.

The first and second internal electrodes 121 and 122 may be stacked so that cross sections thereof are exposed to opposing ends of the ceramic body 110, respectively. Specifically, the first and second internal electrodes 121 and 122 may be exposed to both surfaces of the ceramic body 110 in the first direction (X direction), respectively, and in this case, the first internal electrode 121 may be exposed in a direction of the first surface S1 of the ceramic body 110 and the second internal electrode 122 may be exposed in a direction of the second surface S2 of the ceramic body 110.

The first and second internal electrodes 121 and 122 may include a conductive metal. The conductive metal may include, for example, silver (Ag), nickel (Ni), copper (Cu), tin (Sn), palladium (Pd), platinum (Pt), iron (Fe), gold (Au), silver (Ag), tungsten (W), titanium (Ti), lead (Pb) and may include one or more conductive metals of these alloys. The first and second internal electrodes 121 and 122 may be formed using a conductive paste containing the conductive metal.

In the multilayer ceramic electronic component according to the present disclosure, the first external electrode 131 and the second external electrode 132 may be disposed on an outer surface of the ceramic body 110. The first external electrode 131 may be disposed on the first surface S1 of the ceramic body 110 of the multilayer ceramic electronic component 100 according to the present disclosure, and the second external electrode 132 may be disposed on the second surface S2 of the ceramic body 110.

The first external electrode 131 may include the first electrode layer 131a, the first conductive layer 131b, and the first metal layer 131c, and the second external electrode 132 may include the second electrode layer 132a, the second conductive layer 132b, and the second metal layer 132c. The first electrode layer 131a may be connected to the first internal electrode 121, and the second electrode layer 132a may be connected to the second internal electrode 122.

In an exemplary embodiment in the present disclosure, the first electrode layer 131a and the second electrode layer 132a of the multilayer ceramic electronic component may be sintered electrodes including a conductive metal. The conductive metal may include at least one of, for example, nickel (Ni), copper (Cu), tin (Sn), palladium (Pd), platinum (Pt), iron (Fe), gold (Au), silver (Ag), tungsten (W), titanium (Ti), lead (Pb), and alloys thereof.

As an example of a method of forming the first electrode layer 131a and the second electrode layer 132a, the first electrode layer 131a and the second electrode layer 132a may be formed by dipping a ceramic body 110 into a conductive paste including a conductive metal and subsequently sintering the ceramic body 110 or by printing the conductive paste on the surface of the ceramic body 110 by a screen-printing method or gravure printing method and sintering the ceramic body. In addition, the first electrode layer 131a and the second electrode layer 132a may be formed by applying the conductive paste to the surface of the ceramic body 110 or transferring a dried film obtained by drying the conductive paste onto the ceramic body 110 and then firing the resultant structure, but is not limited thereto. For example, the first electrode layer 131a and the second electrode layer 132a may be formed by forming the conductive paste on the ceramic body 110 by various methods other than the methods described above and then sintering the same.

The first coating layer 141 of the multilayer ceramic electronic component according to the present disclosure may be disposed on the ceramic body 110, the first electrode layer 131a, and the second electrode layer 132a. That is, the first electrode layer 131a, a first portion of the first coating layer 141, and the first conductive layer 131b may be sequentially stacked on the ceramic body 110, and the second electrode layer 132a, a second portion of the first coating layer 141, and the second conductive layer 132b may be sequentially stacked on the ceramic body 110. In the present disclosure, when it is stated that a member is "arranged on" a predetermined region, it may not only mean that the member is disposed in direct contact with the region but also mean that another component is disposed between the member and the region so that the member is indirectly connected to the region.

In an example of the present disclosure, the first coating layer 141 of the multilayer ceramic electronic component of the present disclosure may be disposed to cover at least a portion of the ceramic body 110. In addition, the first coating layer 141 of the multilayer ceramic electronic component of the present disclosure may be disposed to substantially cover the entire ceramic body 110. That is, the first coating layer 141 may extend between the first and second electrode layers 131a and 132a on a surface of the ceramic body 110. In the present disclosure, when it is mentioned that a member is disposed to cover a certain region, it may mean that the member is disposed so that a portion of the region covered by the member is not observed from the outside. In addition, in the present disclosure, when it is mentioned that a member "covers substantially all" of a certain region, it may mean that, in a strict sense, not only is the member disposed to cover all of the region, but also includes errors in a manufacturing process, and, for example, it may mean that a ratio of the region in which the member is not disposed to a total area of the region is 0% or more and/or 5% or less.

In addition, the first coating layer 141 of the multilayer ceramic electronic component of the present disclosure may be disposed to cover at least a portion of the first electrode layer 131a and the second electrode layer 132a, and the first coating layer 141 may be disposed to substantially cover an entirety of the first electrode layer 131a and the second electrode layer 132a.

In an exemplary embodiment of the present disclosure, the first coating layer 141 of the multilayer ceramic electronic component according to the present disclosure may include an alkyl(meth)acrylate-based polymer. In the present disclosure, "(meth)acrylate-based polymer" may refer to a polymer having a repeating unit derived from a (meth) acrylate monomer, and specifically, may refer to a polymer having a weight-average molecular weight of 10,000 to 1,000,000. In addition, in the present disclosure, "(meth) acrylate" may refer to encompassing both acrylate and methacrylate, and "alkyl(meth)acrylate" may refer to (meth) acrylate in which an alkyl group is substituted at a terminal. The alkyl group may mean to include a carbon chain structure in which an unsaturated bond does not exist in a functional group and may mean to include a linear or branched carbon chain structure having 1 to 24 carbon atoms.

In general, the first coating layer 141 used in electronic components is often formed of an inorganic thin film. This is because, in the case of organic materials, mechanical properties may vary according to temperature conditions, and there are limitations such as not being exposed to high temperatures during a manufacturing process. Meanwhile, in the case of using an organic material, the first coating layer 141 is formed of an epoxy resin or a compound containing silicon, which has good versatility, and the compound containing silicon has good adhesion with ceramics, for example, a silane coupling agent. However, the epoxy resin and the silicon-containing resins such as siloxanes cause yellowing when exposed to an external environment for a long time and overcuring proceeds to cause cracks. In the multilayer ceramic electronic component according to the present disclosure, the first coating layer 141 is formed using the aforementioned alkyl (meth)acrylate-based polymer, preventing yellowing and cracks, thereby implementing better moisture resistance reliability.

In an example of the present disclosure, the alkyl(meth) acrylate-based polymer included in the first coating layer 141 of the multilayer ceramic electronic component may include at least one halogen group element substituted with hydrogen. The halogen group element may be one or more selected from the group consisting of fluorine (F), chlorine (Cl), bromine (Br), iodine (I), astatine (At), and tennessine (Ts). The halogen group element may be substituted with an alkyl group, but is not limited thereto. The substituted halogen group element may be at least one, and an upper limit thereof is not particularly limited but may be less than or equal to the number of hydrogens in the alkyl group. Alkyl (meth)acrylate may have various physical properties depending on the functional group at the terminal, and may have excellent water repellency when the halogen group element is substituted as in this example.

In the above example, the alkyl(meth)acrylate-based polymer included in the first coating layer 141 of the multilayer ceramic electronic component of the present disclosure may include fluorine (F) as a halogen group element substituted with hydrogen. The fluorine (F) may be substituted with the alkyl group of the alkyl(meth)acrylate as described above. When fluorine (F) is substituted, the first coating layer 141 including the alkyl(meth)acrylate-based polymer may have low surface energy, and thus, may have better water repellency.

A specific example of the alkyl(meth)acrylate-based polymer may include 1H, 1H, 2H, 2H-perfluorodecylacrylate (PFDA), perfluorodecyl methacrylate (PFDMA), dodecafluoroheptyl acrylate, pentafluorophenyl methacrylate, 3,3,4,4,5,5,6,6,7,7,8,8,9,9,9-pentadecafluorononyl acrylate, 2-methyl-3,3,4,4,5,5,6,6,7,7,8,8,9,9,9-pentadecafluorononyl acrylate, 3,3,4,4,5,5,6,6,7,7,8,8,8-tridecafluorooctyl acrylate, 2-methyl-3,3,4,4,5,5,6,6,7,7,8,8,8-tridecafluorooctyl acrylate, 3,3,4,4,5,5,6,6,7,7,7-undecafluoroheptyl acrylate, 2-methyl-3,3,4,4,5,5,6,6,7,7,7-undecafluoroheptyl acrylate, 3,3,4,4,5,5,6,6,6-nonafluorohexyl acrylate, 2-methyl-3,3,4,4,5,5,6,6,6-nonafluorohexyl acrylate, 3,3,4,4,5,5,6,6,7,7,8,8,9,9,10,10,11,11,11-nonadecafluoroun decyl acrylate, 2-methyl-3,3,4,4,5,5,6,6,7,7,8,8,9,9,10,10,11,11,11-nonadecafluoroun decyl acrylate, 3,3,4,4,5,5,6,6,7,7,8,8,9,9,10,10,11,11,12,12,12-heneicosafluorododecyl acrylate, 2-methyl-3,3,4,4,5,5,6,6,7,7,8,8,9,9,10,10,11,11,12,12,12-heneicosafluorododecyl acrylate, 3,3,4,4,5,5,6,6,7,7,8,8,9,9,10,10,11,11,12,12,13,13,13-tricosafluorotridecyl acrylate, 2-methyl-3,3,4,4,5,5,6,6,7,7,8,8,9,9,10,10,11,11,12,12,13,13,13-tricosafluorotridecyl acrylate, 3,3,4,4,5,5,6,6,7,7,8,8,9,9,10,10,11,11,12,12,13,13,14,14,14-pentacosafluorotetradecyl acrylate, 2-methyl-3,3,4,4,5,5,6,6,7,7,8,8,9,9,10,10,11,11,12,12,13,13,14,14,14-pentacosafluorotetradecyl acrylate, and the like, but is not limited thereto.

In an example, an average thickness of the first coating layer 141 of the multilayer ceramic electronic component according to the present disclosure may satisfy a range of 20 nm or more and/or 60 nm or less. In the present disclosure, "thickness" may refer to a thickness of a member measured in a direction perpendicular to a surface of the member, and "average thickness" may refer to an arithmetic mean of a thickness measured from points of a region in which the member is disposed and equally divided into 10 parts in a cross-section at the center of the multilayer ceramic electronic component taken in a direction perpendicular to the Z axis. The measurement of an average thickness is not limited to these examples, and one of ordinary skill may choose the number of measurement points, the interval between the measurement points, and so forth, if necessary. The measurement of the average thickness for each measurement point may be done by using a microscopy image, for example, a scanning electron microscope (SEM) image, but is not limited thereto. In the multilayer ceramic electronic component according to the present disclosure, since a conductive layer is directly formed on the first coating layer 141 as described later, if the average thickness of the first coating layer 141 exceeds 60 nm, current may not flow easily and breaking may occur in the conductive layer, and if the average thickness of the first coating layer 141 is less than 20 nm, water repellency may be insufficient to make it difficult to implement desired moisture resistance reliability.

A method of forming the first coating layer 141 of the multilayer ceramic electronic component according to the present disclosure is not particularly limited. For example, the first coating layer 141 may be formed using, for example, an atomic layer deposition (ALD) method, a molecular layer deposition (MLD) method, a chemical vapor deposition (CVD) method, sputtering method, etc, but is not limited thereto.

According to an example of the present disclosure, the first and second conductive layers 131*b* and 132*b* disposed on the first coating layer 141 of the multilayer ceramic electronic component may be plating layers. The first and second conductive layers 131*b* and 132*b* may contain the most nickel (Ni) and may include at least one selected from the group consisting of copper (Cu), tin (Sn), palladium (Pd), platinum (Pt), gold (Au), silver (Ag), tungsten (W), titanium (Ti), lead (Pb) and alloys thereof, but are not limited thereto. The plating layers may be formed of a single layer or a plurality of layers and may be formed by sputtering or electrolytic plating, but are not limited thereto.

In an exemplary embodiment of the present disclosure, the first and second metal layers respectively disposed on the first and second conductive layers 131*b* and 132*b* of the multilayer ceramic electronic component may be plating layers. The first metal layer 131*c* may be disposed to cover the first conductive layer 131*b*, and the second metal layer 132*c* may be disposed to cover the second conductive layer 132*b*. The first and second metal layers 131*c* and 132*c* may contain the most tin (Sn) and may include at least one selected from the group consisting of copper (Cu), nickel (Ni), palladium (Pd), platinum (Pt), gold (Au), silver (Ag), tungsten (W), titanium (Ti), lead (Pb), and alloys thereof, but are not limited thereto.

In an example, at least a portion of the first external electrode 131 of the multilayer ceramic electronic component according to the present disclosure may extend onto the third surface S3, the fourth surface S4, the fifth surface S5, and the sixth surface S6 of the ceramic body 110. In addition, at least a portion of the second external electrode 132 may extend onto the third surface S3, the fourth surface S4, the fifth surface S5, and the sixth surface S6 of the ceramic body 110. In this case, the first external electrode 131 and the second external electrode 132 may be disposed to be spaced apart from each other. When at least a portion of the first external electrode 131 and/or the second external electrode 132 extends to the third surface S3, the fourth surface S4, the fifth surface S5, and the sixth surface S6 of the ceramic body 110, the extended portion may function as a so-called band portion and function to improve a mounting strength of the multilayer ceramic electronic component 100 according to the present disclosure and prevent moisture penetration.

In an exemplary embodiment in the present disclosure, the multilayer ceramic electronic component according to the present disclosure may further include a second coating layer 142 disposed on the ceramic body 110, the first external electrode 131, and the second external electrode 132. The second coating layer 142 may be disposed to cover the ceramic body 110, the first external electrode 131, and the second external electrode 132. In this case, the second coating layer 142 may be disposed to cover all of the ceramic body 110, the first external electrode 131, and the second external electrode 132. That is, the second coating layer 142 of the present disclosure may be disposed to cover the entire surface of the multilayer ceramic electronic component. The second coating layer 142 may extend between the first and second conductive layers 131b and 132b on a surface of the first coating layer 141. Thereby, better moisture resistance reliability may be obtained, compared to a case in which the second coating layer 142 is formed only on a portion of the electronic component.

The second coating layer 142 may include a first layer 142a and a second layer 142b. The first layer 142a and the second layer 142b may be sequentially stacked and disposed on the ceramic body 110, the first external electrode 131, and the second external electrode 132. In this case, the first layer 142a may be disposed in direct contact with the ceramic body 110, the first external electrode 131, and the second external electrode 132, and the second layer 142b may be disposed on the first layer 142a.

At this time, the second coating layer 142 may include a crosslinking connecting the first layer 142a and the second layer 142b. In the present disclosure, "bonding" may refer to a state in which surfaces of an adhesive and an adherend are bonded by bonding force of an interface. The bonding force of the interface may be due to a chemical interaction between surface molecules of the adhesive and the adherend or may be due to mechanical bonding. In the present disclosure, the term "crosslinking" may refer to forming a network structure through chemical/physical bonds such as covalent bonds, ionic bonds, Van der Waals bonds, or hydrogen bonds between molecules. Since the first layer 142a and the second layer 142b are connected through the crosslinking, the first layer 142a and the second layer 142b may have a more excellent bonding force.

In an example of the present disclosure, a component is not particularly limited as long as the first layer 142a of the multilayer ceramic electronic component exhibits excellent adhesion with the ceramic body 110 and/or the second layer 142b to be described later. The first layer 142a may include at least one selected from polystyrene, vinyl acetate, polyester, polyethylene, polypropylene, polyamide, rubber, acrylic, phenol, epoxy, urethane, siloxane, melamine, and alkyd-based polymers, but is not limited thereto.

In an example, a polymer of the first layer 142a of the multilayer ceramic electronic component according to the present disclosure may include a compound containing two or more vinyl groups. The compound containing two or more vinyl groups is to improve mechanical/chemical strength of the second coating layer 142 according to the present disclosure and may be bonded to the surface of the ceramic body 110 and crosslinked with the second layer 142b to be described later. In the multilayer ceramic electronic component according to the present disclosure, the compound containing two or more vinyl groups may be applied to the first layer 142a to improve bonding strength with the surface of the ceramic body 110 and/or the second layer 142b.

The compound containing two vinyl groups is not particularly limited, but may be, for example, 2,4,6,8-tetramethyl-2,4,6,8-tetravinylcyclotetrasiloxane (V4D4), 1,3,5-trimethyl-1,3,5-trivinyl-cyclotrisiloxane (V3D3), divinylbenzene (DVB), diethyleneglycoldivinylether (DEGDVE), ethyleneglycoldiacrylate (EGDA), ethyleneglycoldimethacrylate (EGDMA), 1,3-diethenyl-1,1,3,3-tetramethyl-disiloxane (V2D2), or the like.

A thickness of the first layer 142a is not particularly limited as long as sufficient bonding strength may be secured, but, for example, an average thickness may satisfy a range of 21 nm or more and/or 420 nm or less.

In an exemplary embodiment in the present disclosure, the second layer 142b of the second coating layer 142 of the multilayer ceramic electronic component may include a hydrophobic polymer. The hydrophobic polymer may refer to a polymer formed from a hydrophobic monomer. In the present disclosure, "hydrophobicity" may mean that a surface formed of a certain component has a contact angle of 90° or more with respect to water at room temperature/1 atmosphere. The hydrophobic monomer is not particularly limited as long as it exhibits sufficient water repellency and may include one or more monomers selected from the group consisting of siloxane-based, acrylic-based, amine-based, carbonate-based, ester-based and fluorocarbon-based monomers.

In an example, the second layer 142b of the multilayer ceramic electronic component according to the present disclosure may include a compound including a vinyl group and fluorine. The vinyl group may form cross-linking with the first layer 142a to enhance the bonding strength of the second layer 142b, and the fluorine-containing compound may provide excellent water repellency and physical/chemical resistance to external contaminants.

The kind of the compound containing the vinyl group and fluorine is not particularly limited. For example, the compound containing the vinyl group and fluorine may include, for example, 1H,1H,2H,2H-perfluorodecylacrylate (PFDA), perfluorodecyl methacrylate (PFDMA), dodecafluoroheptyl acrylate, pentafluorophenyl methacrylate, 3,3,4,4,5,5,6,6,7,7,8,8,9,9,9-pentadecafluorononyl acrylate, 2-methyl-3,3,4,4,5,5,6,6,7,7,8,8,9,9,9-pentadecafluorononyl acrylate, 3,3,4,4,5,5,6,6,7,7,8,8,8-tridecafluorooctyl acrylate, 2-methyl-3,3,4,4,5,5,6,6,7,7,8,8,8-tridecafluorooctyl acrylate, 3,3,4,4,5,5,6,6,7,7,7-undecafluoroheptyl acrylate, 2-methyl-3,3,4,4,5,5,6,6,7,7,7-undecafluoroheptyl acrylate, 3,3,4,4,5,5,6,6,6-nonafluorohexyl acrylate, 2-methyl-3,3,4,4,5,5,6,6,6-nonafluorohexyl acrylate, 3,3,4,4,5,5,6,6,7,7,8,8,9,9,10,10,11,11,11-nonadecafluoroundecyl acrylate, 2-methyl-3,3,4,4,5,5,6,6,7,7,8,8,9,9,10,10,11,11,11-nonadecafluoroundecyl acrylate, 3,3,4,4,5,5,6,6,7,7,8,8,9,9,10,10,11,11,12,12,12-heneicosafluorododecyl acrylate, 2-methyl-3,3,4,4,5,5,6,6,7,7,8,8,9,9,10,10,11,11,12,12,12-heneicosafluorododecyl acrylate, 3,3,4,4,5,5,6,6,7,7,8,8,9,9,10,10,11,11,12,12,13,13,13-triosafluorotridecyl acrylate, 2-methyl-3,3,4,4,5,5,6,6,7,7,8,8,9,9,10,10,11,11,12,12,13,13,13-tricosafluorotridecyl acrylate, 3,3,4,4,5,5,6,6,7,7,8,8,9,9,10,10,11,11,12,12,13,13,14,14,14-pentacosafluorotetradecyl acrylate, 2-methyl-3,3,4,4,5,5,6,6,7,7,8,8,9,9,10,10,11,11,12,12,13,13,14,14,14-pentacosafluorotetradecyl acrylate, and the like but is not limited thereto.

In another exemplary embodiment in the present disclosure, the second layer 142b of the multilayer ceramic electronic component may be an inorganic thin film layer. The inorganic thin film layer may be formed of an oxide, a nitride, or a compound thereof of a metal and/or non-metal compound. In this exemplary embodiment, when the second layer 142b of the second coating layer 142 is an inorganic thin film layer, a chemical reaction with external contaminants may be minimized, thereby improving reliability of the second coating layer 142. Components of the inorganic thin film layer may include an oxide of one or more selected from the group consisting of $Al_2O_3$, $HfO_2$, $ZrO_2$, $La_2O_3$, $SiO_2$, $Ta_2O_5$, $Nb_2O_5$, $Y_2O_3$, $SrTiO_3$, $BaTiO_3$ and a nitride of one or more selected from the group consisting of AlN and $SiN_x$.

A thickness of the second layer 142b is not particularly limited as long as sufficient bonding strength may be ensured, but, for example, an average thickness may satisfy a range of 21 nm or more and/or 420 nm or less.

In an exemplary embodiment in the present disclosure, an average thickness of the second coating layer 142 of the multilayer ceramic electronic component may be 50 nm or more and/or 700 nm or less. If the thickness of the second coating layer 142 of the multilayer ceramic electronic component of the present exemplary embodiment is less than 50 nm, bonding force of the first layer 142a may be weakened and water repellency may be lowered. In addition, if the average thickness of the second coating layer 142 exceeds 700 nm, ion migration inhibiting power and adhesion of the second coating layer 142 may be excellent but bonding strength with a solder may be lowered due to the excessively thick second coating layer 142, so that board adhesion strength may be reduced when the multilayer ceramic electronic component is mounted on a board.

A method of forming the first layer 142a and the second layer 142b of the multilayer ceramic electronic component according to the present disclosure is not particularly limited. For example, the first layer 142a and the second layer 142b may be formed using an atomic layer deposition (ALD) method, a molecular layer deposition (MLD) method, a chemical vapor deposition (CVD) method, sputtering method, etc, but is not limited thereto.

In the above exemplary embodiments, descriptions of contents overlapping with the above-described exemplary embodiments will be omitted.

Experimental Example

Suppression of ion migration, bonding strength, mounting defects, and moisture resistance load defect of the multilayer ceramic electronic component according to the present disclosure were tested under the following conditions.

The components used in the test were formed by forming first and second electrode layers of copper (Cu) on a ceramic body and then forming the first coating layer 141 using iCVD equipment. Thereafter, a Ni plating layer and an Sn plating layer were sequentially formed on the first coating layer 141. After forming the Sn plating layer, a second coating layer was formed using the iCVD equipment. As the components, 100 MLCCs for mass production of Samsung Electro-Mechanics having a size of 1.6 mm×0.8 mm×0.8 mm were used.

Tetrabutyl peroxide (TBPO) was used as a deposition initiator. As a first layer 142a, 2,4,6,8-Tetramethyl-2,4,6,8-tetravinylcyclotetrasiloxane (V4D4) was used, and as a second layer 142b, perfluorodecyl methacrylate (PFDMA) was used.

As for deposition conditions, the multilayer ceramic electronic component was placed on a board maintained at 40° C. and a filament temperature was set to 200° C. Thereafter, the multilayer ceramic electronic component in which thicknesses of the first coating layer and the second coating layer are different was manufactured by adjusting a deposition time.

An ion migration test was conducted by dropping 1.3 ml distilled water between external electrodes at 25° C. and 1 atmosphere and applying 15 V DC power to both external electrodes. Upon applying power, ion migration proceeded and it is observed that dendrites of a metal component grew from a negative (−) electrode to a positive (+) electrode of the MLCC. The moment when both electrodes of the multilayer ceramic electronic component were connected with the grown dendrite, a current of 1 mA or more flowed, and here, the number of components in which the current flowed within 5 minutes was measured. FIG. 6(a) is an image of a component in which ion migration did not occur, and FIG. 6(b) is an image of a component in which ion migration occurred.

The bonding strength test was conducted using an adhesive tape having a peel-off of 30 gf/25 mm measured at a speed of 300 mm/min and a 90° angle at 25° C. on a glass board. The adhesive tape was attached to a surface of the multilayer ceramic electronic component, and after 1 minute elapsed, the adhesive tape was separated by applying a force at a 90° angle. After the separation, the number of components from which the second coating layer was removed on the surface to which the adhesive tape was attached was measured.

In the mounting defect test, a multilayer ceramic electronic component is mounted on a board to which an electrode pad is attached using solder, and the number of components which were not aligned was measured. FIG. 7(a) is an image of a component which was not misaligned, FIG. 7(b) is an image of a component with distortion, and FIG. 7(C) is an image of a case where a component was released.

In the moisture resistance load test, the number of occurrences of defects when applying a rated voltage at 85° C. and relative humidity of 85% was measured.

TABLE 1

| Thickness of first coating layer (nm) | Plating defect | Thickness of second coating layer (nm) | Capacity defect | Migration defect | Mounting defect | Moisture resistance load defect test |
|---|---|---|---|---|---|---|
| 0 | 0/100 | 200 | 11/100 | 5/100 | 0/100 | 11/100 |
| 10 | 0/100 |  | 4/100 | 3/100 | 0/100 | 3/100 |
| 20 | 0/100 |  | 0/100 | 0/100 | 0/100 | 0/100 |
| 30 | 0/100 |  | 0/100 | 0/100 | 0/100 | 0/100 |
| 40 | 0/100 |  | 0/100 | 0/100 | 0/100 | 0/100 |
| 50 | 0/100 |  | 0/100 | 0/100 | 0/100 | 0/100 |
| 60 | 0/100 |  | 0/100 | 0/100 | 0/100 | 0/100 |
| 70 | 3/100 |  | 0/100 | 0/100 | 0/100 | 0/100 |
| 80 | 8/100 |  | 9/100 | 0/100 | 0/100 | 0/100 |
| 90 | 16/100 |  | 24/100 | 0/100 | 0/100 | 0/100 |
| 100 | 22/100 |  | 48/100 | 0/100 | 0/100 | 0/100 |

Referring to Table 1, it may be seen that, when the average thickness of the second coating layer is 200 nm, if the average thickness of the first coating layer is less than 20 nm, capacity defect and ion migration occur and moisture resistance load defect appear, but it may be seen that, when the average thickness of the first coating layer is 20 nm, excellent results are obtained in all tests. In addition, it may be seen that, when the average thickness of the first coating layer is 70 nm under the same conditions, a number of plating defects occur, but when the average thickness of the first coating layer is 60 nm, no defect occurs in all kinds of tests.

TABLE 2

| Thickness of first coating layer (nm) | Thickness of second coating layer (nm) | Plating defect | Capacity defect | Migration defect | Mounting defect | Moisture resistance load defect test |
|---|---|---|---|---|---|---|
| 50 | 0 | 0/100 | 0/100 | 18/100 | 0/100 | 13/100 |
|  | 10 | 0/100 | 0/100 | 13/100 | 0/100 | 8/100 |
|  | 20 | 0/100 | 0/100 | 7/100 | 0/100 | 6/100 |
|  | 30 | 0/100 | 0/100 | 5/100 | 0/100 | 4/100 |
|  | 40 | 0/100 | 0/100 | 2/100 | 0/100 | 1/100 |
|  | 50 | 0/100 | 0/100 | 0/100 | 0/100 | 0/100 |
|  | 60 | 0/100 | 0/100 | 0/100 | 0/100 | 0/100 |
|  | 70 | 0/100 | 0/100 | 0/100 | 0/100 | 0/100 |
|  | 80 | 0/100 | 0/100 | 0/100 | 0/100 | 0/100 |
|  | 90 | 0/100 | 0/100 | 0/100 | 0/100 | 0/100 |
|  | 100 | 0/100 | 0/100 | 0/100 | 0/100 | 0/100 |
|  | 150 | 0/100 | 0/100 | 0/100 | 0/100 | 0/100 |
|  | 200 | 0/100 | 0/100 | 0/100 | 0/100 | 0/100 |
|  | 250 | 0/100 | 0/100 | 0/100 | 0/100 | 0/100 |
|  | 300 | 0/100 | 0/100 | 0/100 | 0/100 | 0/100 |
|  | 350 | 0/100 | 0/100 | 0/100 | 0/100 | 0/100 |
|  | 400 | 0/100 | 0/100 | 0/100 | 0/100 | 0/100 |
|  | 500 | 0/100 | 0/100 | 0/100 | 0/100 | 0/100 |
|  | 600 | 0/100 | 0/100 | 0/100 | 0/100 | 0/100 |
|  | 700 | 0/100 | 0/100 | 0/100 | 0/100 | 0/100 |
|  | 800 | 0/100 | 0/100 | 0/100 | 9/100 | 0/100 |

Referring to Table 2, it may be seen that, when the average thickness of the first coating layer is 50 nm, if the average thickness of the second coating layer is less than 50 nm, ion migration occurred and moisture resistance load defect appear, but it may be seen that, when the average thickness of the second coating layer is 50 nm, excellent results are obtained in all tests. In addition, it may be seen that, when the average thickness of the second coating layer exceeds 700 nm under the same conditions, mounting defect occurs, but when the average thickness of the second coating layer is 700 nm, no defect occurs in all kinds of tests.

Therefore, when the test results are put together, it may be seen that excellent results are obtained in all kinds of tests when an average thickness of the first coating layer of the multilayer ceramic electronic component is 20 nm or more and/or 60 nm or less, and it may be seen that excellent results are obtained in all kinds of tests when an average thickness of the second coating layer is 50 nm or more and/or 700 nm or less.

As set forth above, according to exemplary embodiments of the present disclosure, deterioration of characteristics due to moisture penetration into the multilayer ceramic electronic component may be prevented.

According to exemplary embodiments of the present disclosure, ion migration of the multilayer ceramic electronic component may be suppressed.

According to exemplary embodiments of the present disclosure, a short-circuit defect of the multilayer ceramic electronic component may be reduced.

According to exemplary embodiments of the present disclosure, the multilayer ceramic electronic component having excellent reliability may be provided.

While exemplary embodiments have been shown and described above, it will be apparent to those skilled in the art that modifications and variations could be made without departing from the scope of the present disclosure as defined by the appended claims.

What is claimed is:
1. A multilayer ceramic electronic component comprising:
a ceramic body including a first internal electrode and a second internal electrode disposed to be alternately stacked in a third direction with a dielectric layer interposed therebetween, the ceramic body having a first surface and a second surface opposing each other in a first direction, a third surface and a fourth surface opposing each other in a second direction, and a fifth surface and a sixth surface opposing each other in the third direction;
a first external electrode connected to the first internal electrode and including a first electrode layer, a first conductive layer, and a first metal layer;
a second external electrode connected to the second internal electrode and including a second electrode layer, a second conductive layer, and a second metal layer; and
a first coating layer disposed on the ceramic body, the first electrode layer and the second electrode layer,
wherein the first coating layer includes an alkyl(meth) acrylate-based polymer.

2. The multilayer ceramic electronic component of claim 1, wherein the alkyl(meth)acrylate-based polymer includes at least one halogen group element substituted with hydrogen.

3. The multilayer ceramic electronic component of claim 2, wherein the halogen group element is fluorine (F).

4. The multilayer ceramic electronic component of claim 1, wherein an average thickness of the first coating layer is within a range of 20 nm or more and/or 60 nm or less.

5. The multilayer ceramic electronic component of claim 1, wherein the first coating layer is disposed to cover at least a portion of the ceramic body.

6. The multilayer ceramic electronic component of claim 1, wherein the first coating layer is disposed to cover at least portions of the first electrode layer and the second electrode layer.

7. The multilayer ceramic electronic component of claim 1, wherein a portion of the first external electrode is disposed on the first surface of the ceramic body and the other remaining portion of the first electrode layer extends onto third to sixth surfaces of the ceramic body, and a portion of the second external electrode is disposed on the second surface of the ceramic body and the other remaining portion of the second electrode layer extends onto the third to sixth surfaces of the ceramic body.

8. The multilayer ceramic electronic component of claim 1, wherein the first conductive layer and the second conductive layer are plating layers.

9. The multilayer ceramic electronic component of claim 1, wherein the first metal layer and the second metal layer are plating layers.

10. The multilayer ceramic electronic component of claim 1, further comprising a second coating layer disposed on the first coating layer, the first metal layer, and the second metal layer.

11. The multilayer ceramic electronic component of claim 10, wherein the second coating layer includes a first layer and a second layer.

12. The multilayer ceramic electronic component of claim 11, wherein the first layer includes a polymer including two or more vinyl groups.

13. The multilayer ceramic electronic component of claim 11, wherein the second layer includes a hydrophobic polymer.

14. The multilayer ceramic electronic component of claim 11, wherein the second layer is an inorganic thin film layer.

15. The multilayer ceramic electronic component of claim 10, wherein an average thickness of the second coating layer is within a range of 500 nm or more and/or 700 nm or less.

16. The multilayer ceramic electronic component of claim 1, wherein the alkyl(meth)acrylate-based polymer includes at least one halogen group element substituted with hydrogen, and an average thickness of the first coating layer is within a range of 20 nm or more and/or 60 nm or less.

17. The multilayer ceramic electronic component of claim 1, wherein the alkyl(meth)acrylate-based polymer includes at least one halogen group element substituted with hydrogen, the halogen group element is fluorine (F), and an average thickness of the first coating layer is within a range of 20 nm or more and/or 60 nm or less.

18. A multilayer ceramic electronic component comprising:
a ceramic body including a first internal electrode and a second internal electrode disposed to be alternately stacked with a dielectric layer interposed therebetween;
a first external electrode connected to the first internal electrode and including a first electrode layer and a first conductive layer;
a second external electrode connected to the second internal electrode and including a second electrode layer and a second conductive layer; and
a first coating layer including an alkyl(meth)acrylate-based polymer,
wherein the first electrode layer, a first portion of the first coating layer, and the first conductive layer are sequentially stacked on the ceramic body, and
the second electrode layer, a second portion of the first coating layer, and the second conductive layer are sequentially stacked on the ceramic body.

19. The multilayer ceramic electronic component of claim 18, further comprising a second coating layer,
wherein the first and second external electrodes include first and second metal layers disposed on the first and second conductive layers, respectively, and
the second coating layer is disposed to cover the first and second metal layers and the first coating layer.

20. The multilayer ceramic electronic component of claim 19, wherein:
the first coating layer extends between the first and second electrode layers on a surface of the ceramic body, and
the second coating layer extends between the first and second conductive layers on a surface of the first coating layer.

* * * * *